United States Patent
Kasai

(10) Patent No.: US 8,541,852 B2
(45) Date of Patent: Sep. 24, 2013

(54) ACOUSTIC SENSOR

(75) Inventor: Takashi Kasai, Kusatsu (JP)

(73) Assignee: OMRON Corporation, Kyoto (JP)

( * ) Notice: Subject to any disclaimer, the term of this patent is extended or adjusted under 35 U.S.C. 154(b) by 218 days.

(21) Appl. No.: 13/106,288

(22) Filed: May 12, 2011

(65) Prior Publication Data

US 2011/0278684 A1  Nov. 17, 2011

(30) Foreign Application Priority Data

May 13, 2010  (JP) .................................. 2010-110946

(51) Int. Cl.
*H01L 29/84*  (2006.01)
(52) U.S. Cl.
USPC ................... 257/416; 257/415; 257/E29.324; 257/430
(58) Field of Classification Search
USPC .................... 257/415–430, E29.324
See application file for complete search history.

(56) References Cited

U.S. PATENT DOCUMENTS

| 7,898,048 B2 * | 3/2011 | Nakatani | 257/416 |
| 2007/0261910 A1 | 11/2007 | Kasai et al. | |
| 2008/0247573 A1 * | 10/2008 | Pedersen | 381/174 |
| 2010/0065930 A1 * | 3/2010 | Nakatani | 257/415 |
| 2010/0175477 A1 | 7/2010 | Kasai et al. | |

FOREIGN PATENT DOCUMENTS

| JP | 2006-157863 A | 6/2006 |
| JP | 2008-301430 A | 12/2008 |
| JP | 4338395 B2 | 10/2009 |
| WO | 02/15636 A2 | 2/2002 |

* cited by examiner

*Primary Examiner* — Mamadou Diallo
(74) *Attorney, Agent, or Firm* — Osha Liang LLP

(57) ABSTRACT

A diaphragm for sensing sound pressure faces a back plate including a plate portion and a fixed electrode film to form a capacitance type acoustic sensor. The back plate is opened with acoustic holes for passing vibration, and is arranged with a plurality of stoppers in a projecting manner on a surface facing the diaphragm. The stopper arranged in an outer peripheral area of the back plate has a small diameter, and the stopper arranged in an internal area has a large diameter. Thus, sticking of the diaphragm is prevented, and the diaphragm is less likely to break by impact when the sensor is dropped.

7 Claims, 14 Drawing Sheets

Prior Art

ACOUSTIC SENSOR

BACKGROUND OF THE INVENTION

1. Technical Field

The present invention relates to acoustic sensors, and specifically to a MEMS (Micro Electro Mechanical Systems) type acoustic sensor manufactured using a MEMS technique.

2. Related Art

A capacitance type acoustic sensor is disclosed in Japanese Patent No. 4338395. In the acoustic sensor of Japanese Patent No. 4338395, a capacitor is configured by facing a thin film diaphragm and a fixed electrode film arranged in a back plate through a microscopic air gap. When the diaphragm vibrates by acoustic vibration, the gap distance between the diaphragm and the fixed electrode film changes by such vibration, and hence the acoustic vibration can be detected by detecting the change in electrostatic capacitance between the diaphragm and the fixed electrode film.

In such a capacitance type acoustic sensor, the diaphragm sometimes fixes to the fixed electrode film (hereinafter a state or a phenomenon in which the diaphragm is partially or substantially entirely fixed to the fixed electrode film so that the gap is eliminated is called a stick) in the manufacturing process or during use. When the diaphragm sticks to the fixed electrode film, the acoustic vibration cannot be detected by the acoustic sensor because the vibration of the diaphragm is inhibited.

The cause of sticking in the acoustic sensor is as follows (details in Japanese Unexamined Patent Publication No. 2008-301430). In the manufacturing process of the acoustic sensor such as a cleaning process after etching a sacrifice layer, moisture infiltrates to the air gap between the diaphragm and the fixed electrode film. Moreover, moisture may infiltrate to the air gap between the diaphragm and the fixed electrode film due to humidity and water wetting even during the use of the acoustic sensor. Meanwhile, the gap distance of the acoustic sensor is only a few micrometers and furthermore, the diaphragm only has a film thickness of about 1 μm and has a weak spring property. Thus, if moisture infiltrates to the air gap, the diaphragm gets adsorbed to the fixed electrode film (this is a first stage of sticking) by capillary force or surface tension, and such a sticking state of the diaphragm is held by the inter-molecular force, inter-surface force, electrostatic force, and the like acting between the diaphragm and the fixed electrode film even after the moisture has evaporated (this is a second stage of sticking).

The first stage of sticking may also occur, such as the diaphragm may attach to the fixed electrode film when a large sound pressure or drop impact is applied on the diaphragm thereby greatly displacing the diaphragm, or the diaphragm may attach to the fixed electrode film when charged with static electricity.

An acoustic sensor in which a great number of stoppers (projections) are arranged on a surface facing the diaphragm of the fixed electrode film to prevent the sticking of the diaphragm is known. Such an acoustic sensor is disclosed in Japanese Unexamined Patent Publication No. 2006-157863, and the like.

FIG. 1 and FIG. 2 is a plan view and a cross-sectional view each showing an acoustic sensor including a stopper. In FIG. 1 and FIG. 2, a mode similar to the acoustic sensor of a first embodiment of a conventional example is shown to facilitate the comparison with a first embodiment of the present invention. In an acoustic sensor 11, a back chamber 15 passes through from an upper surface to a lower surface of a silicon substrate 12, and a diaphragm 13 of thin film form made of polysilicon is arranged on the upper surface of the silicon substrate 12 to cover an upper surface of the back chamber 15. Furthermore, a canopy shaped back plate 14 is fixed to the upper surface of the silicon substrate 12 so as to cover the diaphragm 13. The back plate 14 has a fixed electrode film 20 made of polysilicon arranged on a lower surface of a plate portion 19 made of SiN. A microscopic air gap is formed between the diaphragm 13 and the fixed electrode film 20, where the diaphragm 13 and the fixed electrode film 20 configure a capacitor. A great number of acoustic holes 18 for passing the acoustic vibration are opened in the entire back plate 14. A plurality of stoppers 22 each having projection shape of the same length and the same diameter are arranged at substantially equal intervals over the entire lower surface of a region facing the diaphragm 13 of the back plate 14.

According to such an acoustic sensor 11, a distal end face of each stopper 22 comes into contact with the diaphragm 13 even when the diaphragm 13 is greatly displaced thereby preventing the diaphragm 13 from overly approaching the back plate 14 and inhibiting the sticking of the diaphragm 13.

SUMMARY

The holding force between the diaphragm 13 and the back plate 14 in the second stage of sticking is known to have correlation with a contacting area of the diaphragm 13 and the back plate 14. In other words, the contacting area of the diaphragm 13 and the stopper 22 becomes large and the holding force of the diaphragm 13 becomes large if the diameter of the stopper 22 is large even if the stopper 22 is arranged on the back plate 14. Therefore, sticking easily occurs if the diameter of the stopper 22 is large even if the stopper 22 is arranged on the back plate 14.

Therefore, the stopper 22 is to be arranged on the back plate 14, and the diameter of the stopper 22 is to be made as small as possible to reduce the contacting area of the diaphragm 13 and the back plate 14 in order to prevent sticking of the diaphragm 13.

However, in the drop accident at the time of actual use or the drop test, the diaphragm 13 hits the stopper 22 when the acoustic sensor 11 is dropped thereby applying a mechanical load on the diaphragm 13. Therefore, if the diameter of the stopper 22 is narrow, a large mechanical load applies on the diaphragm 13 and the diaphragm 13 may easily break when the acoustic sensor 11 is dropped and the diaphragm 13 hits the stopper 22.

Therefore, in the conventional acoustic sensor, the performance of preventing sticking and the drop resistance property are in a contradicting relationship with each other, and an acoustic sensor that satisfies both properties could not be formed. Japanese Unexamined Patent Publication No. 2008-301430 discloses the acoustic sensor in which the interval of the stopper is differed depending on the region to arrange the stopper, but the performance of preventing sticking and the drop resistance property cannot be simultaneously satisfied with such a technique.

Therefore, one or more embodiments of the present invention provides an acoustic sensor in which sticking of the diaphragm can be prevented and also in which the diaphragm is less likely to break by impact when the sensor is dropped.

In accordance with one or more embodiments of the present invention, an acoustic sensor includes a back plate including a fixed film arranged on an upper side of a semiconductor substrate and a fixed electrode film arranged on the fixed film, and a vibration electrode film arranged on an upper side of the semiconductor substrate to face the back plate through a void, for converting an acoustic vibration to change in electrostatic capacitance between the vibration electrode film and the fixed electrode film, wherein a plurality of projections are arranged on a surface on the void side of at least one of the back plate and the vibration electrode film, and a cross-sectional area of the projection is differed according to a projection forming region in at least one of the back plate and the vibration electrode film.

In the acoustic sensor described above, the semiconductor substrate is formed with the hollow portion from the upper surface to the lower side, the vibration electrode film is arranged on the upper surface of the semiconductor substrate, the back plate is fixed on the upper surface of the semiconductor substrate so as to cover the vibration electrode film, and a plurality of acoustic holes are opened in the back plate. Alternatively, the back plate may be fixed on the upper surface of the semiconductor substrate, and the vibration electrode film may be arranged on the upper side of the back plate.

In an acoustic sensor according to one or more embodiments of the present invention, a plurality of types of projections having different cross-sectional areas are arranged so that the forming region of the projection having a relatively small cross-sectional area where sticking is less likely to occur and the forming region of the projection having a relatively large cross-sectional area where impact applied on the vibration electrode film can be reduced are differed, so that the sticking of the vibration electrode film can be prevented by optimizing the forming region of the projections having different cross-sectional areas, and the breakage of the vibration electrode film is less likely to occur by the impact when the sensor is dropped.

In an acoustic sensor according to one or more embodiments of the present invention, three or more types of projections having different cross-sectional areas are arranged, where the projections are arranged so that the cross-sectional area sequentially becomes smaller toward the outer peripheral side from the center of at least one of the back plate and the vibration electrode film. Accordingly, the cross-sectional area of the projection is small in the outer peripheral area where the elastic restoring force when the vibration electrode film is the free end and sticks to the back plate is weak, so that the holding force in the outer peripheral area when the vibration electrode film sticks can be reduced and the sticking of the vibration electrode film is less likely to occur. Because the cross-sectional area of the projection is large at the central part where the vibration electrode film tends to easily hit the back plate when receiving an impact or the like, the impact applied on the vibration electrode film can be alleviated. Therefore, the sticking of the vibration electrode film can be prevented and the breakage of the vibration electrode film due to the impact when the sensor is dropped can be prevented.

In an acoustic sensor according to one or more embodiments of the present invention, the projection having a relatively small cross-sectional area is arranged in the outer peripheral area of at least one of the back plate and the vibration electrode film, and the projection having a relatively large cross-sectional area is arranged in the internal area of at least one of the back plate and the vibration electrode film. Accordingly, the cross-sectional area of the projection is small in the outer peripheral area where the elastic restoring force when the vibration electrode film is a free end and sticks to the back plate is weak, so that the holding force in the outer peripheral area when the vibration electrode film sticks can be reduced and sticking is less likely to occur. Furthermore, since the cross-sectional of the projection is large in the internal where the vibration electrode film tends to easily hit the back plate the first when receiving the impact or the like, the impact to be applied on the vibration electrode film can be alleviated. Therefore, the sticking of the vibration electrode film can be prevented and the breakage of the vibration electrode film due to the impact when the sensor is dropped can be prevented.

According to one or more embodiments of the present invention, the width of the outer peripheral area where the projection having a relatively small cross-sectional area is arranged is smaller than or equal to ¼ of the width of the back plate or the vibration electrode film. If the width of the outer peripheral area is greater ¼, the vibration electrode film may be in contact with the projection having a small cross-sectional area and break when impact is applied, and hence, the impact resistance may be affected.

In one or more embodiments of the present invention where the vibration electrode film is arranged on the upper surface of the semiconductor substrate and the back plate is arranged on the upper surface of the semiconductor substrate so as to cover the vibration electrode film, a plurality of projections are arranged in a region facing the upper surface of the semiconductor substrate of the lower surface of the vibration electrode film, and the cross-sectional area of the projection arranged at the outer peripheral part of the region may be smaller than the cross-sectional area of the projection arranged at the inner peripheral part of the region. Accordingly, the vibration electrode film can be prevented from sticking to the upper surface of the semiconductor substrate, and the vibration electrode film can be prevented from hitting the semiconductor substrate and breaking due to the impact or the like.

DETAILED DESCRIPTION

Hereinafter, embodiments of the present invention will be described with reference to the accompanying drawings. Note that the present invention is not limited to the following embodiments, and various design changes can be made within a scope not deviating from the gist of the present invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
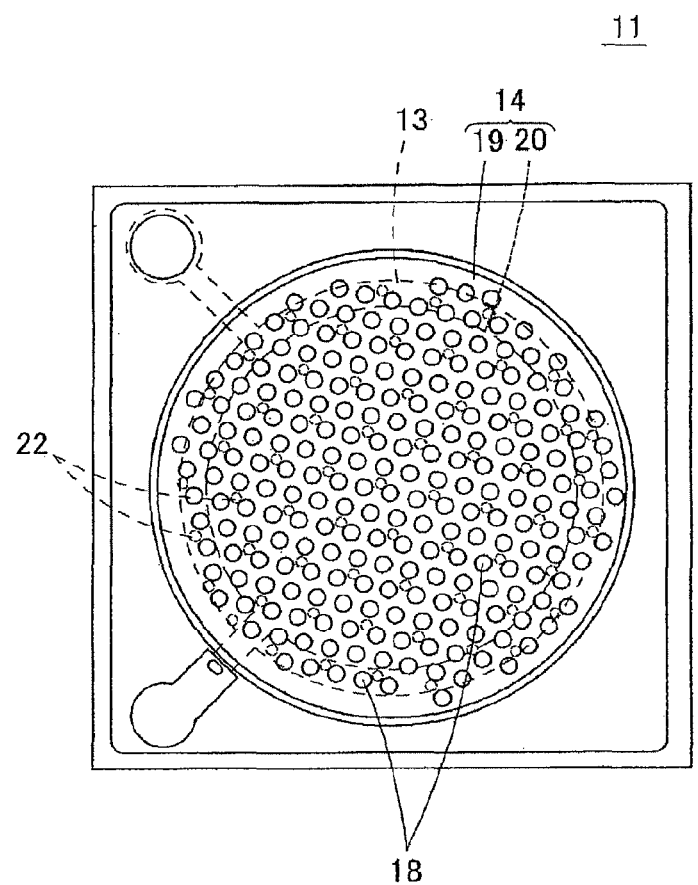
FIG. 1 is a plan view of an acoustic sensor of a conventional example.
Figure 2:
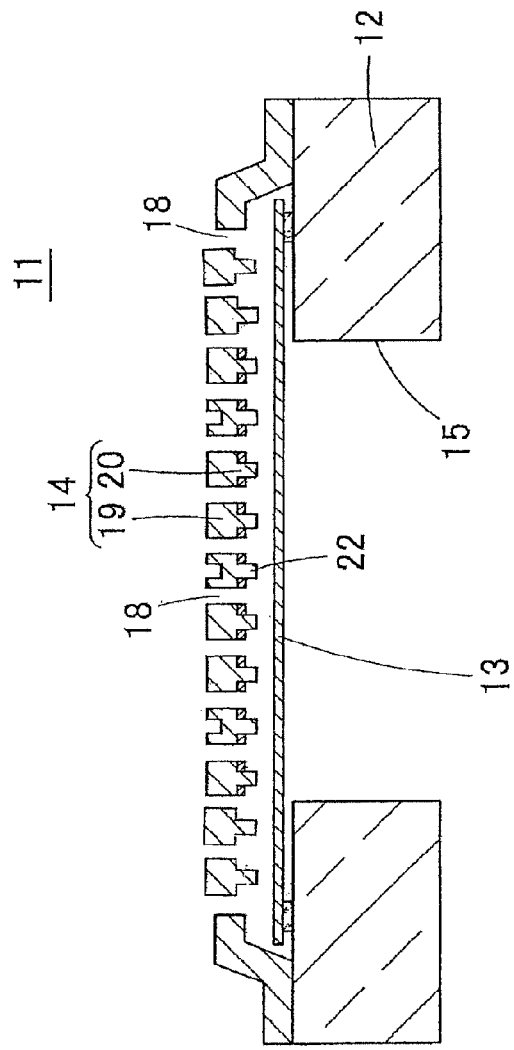
FIG. 2 is a cross-sectional view of the acoustic sensor shown in FIG. 1.
Figure 3:
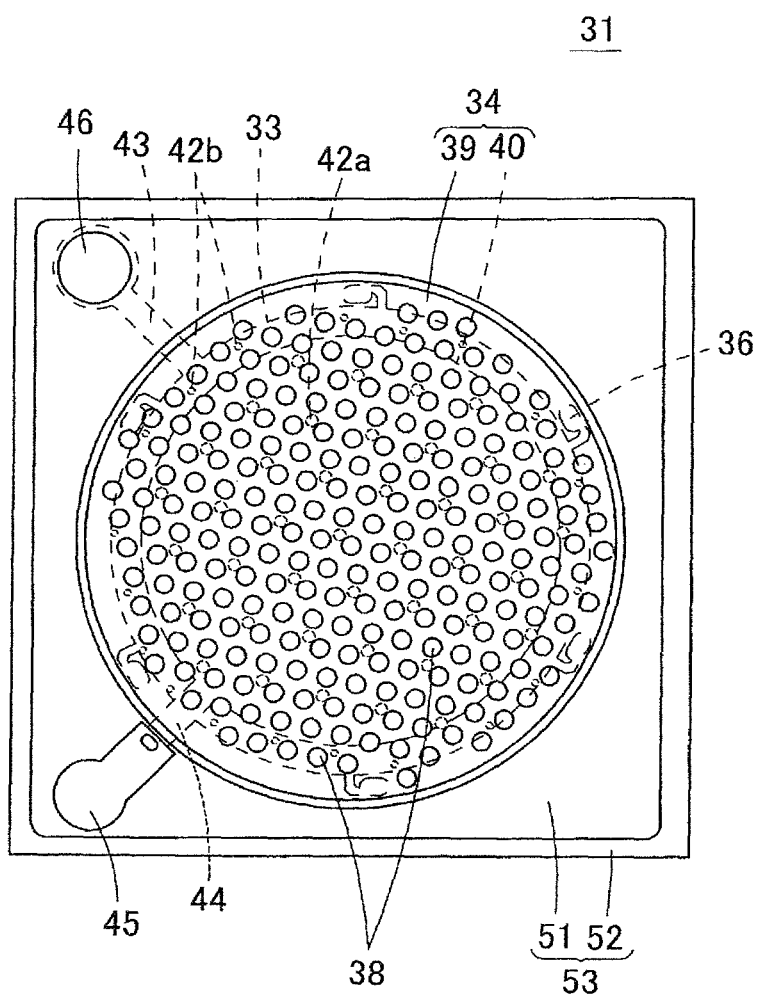
FIG. 3 is a plan view showing an acoustic sensor of a first embodiment according to the present invention.
Figure 4:
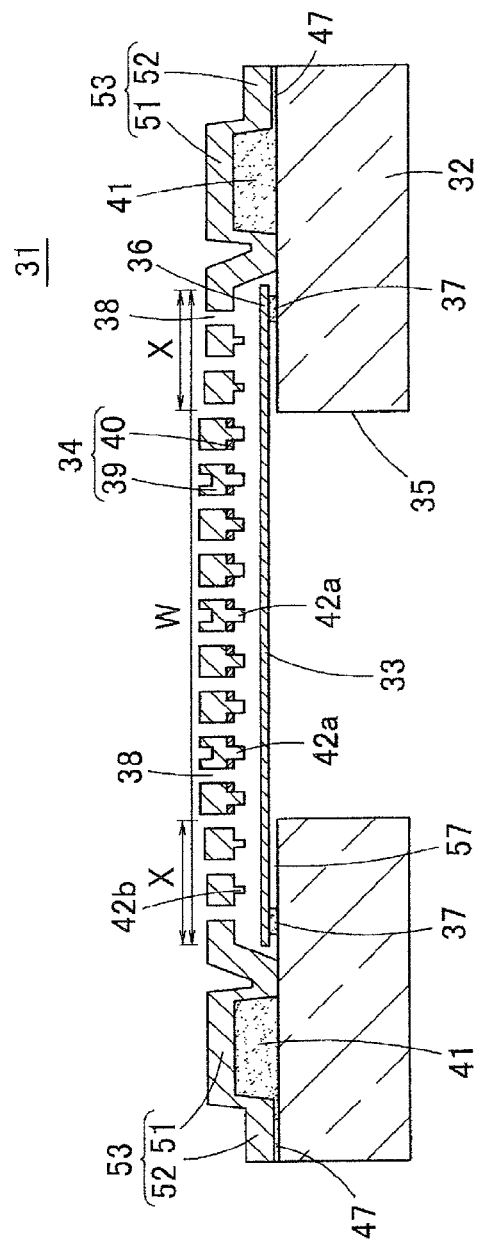
FIG. 4 is a cross-sectional view showing the acoustic sensor of the first embodiment.
Figure 5:
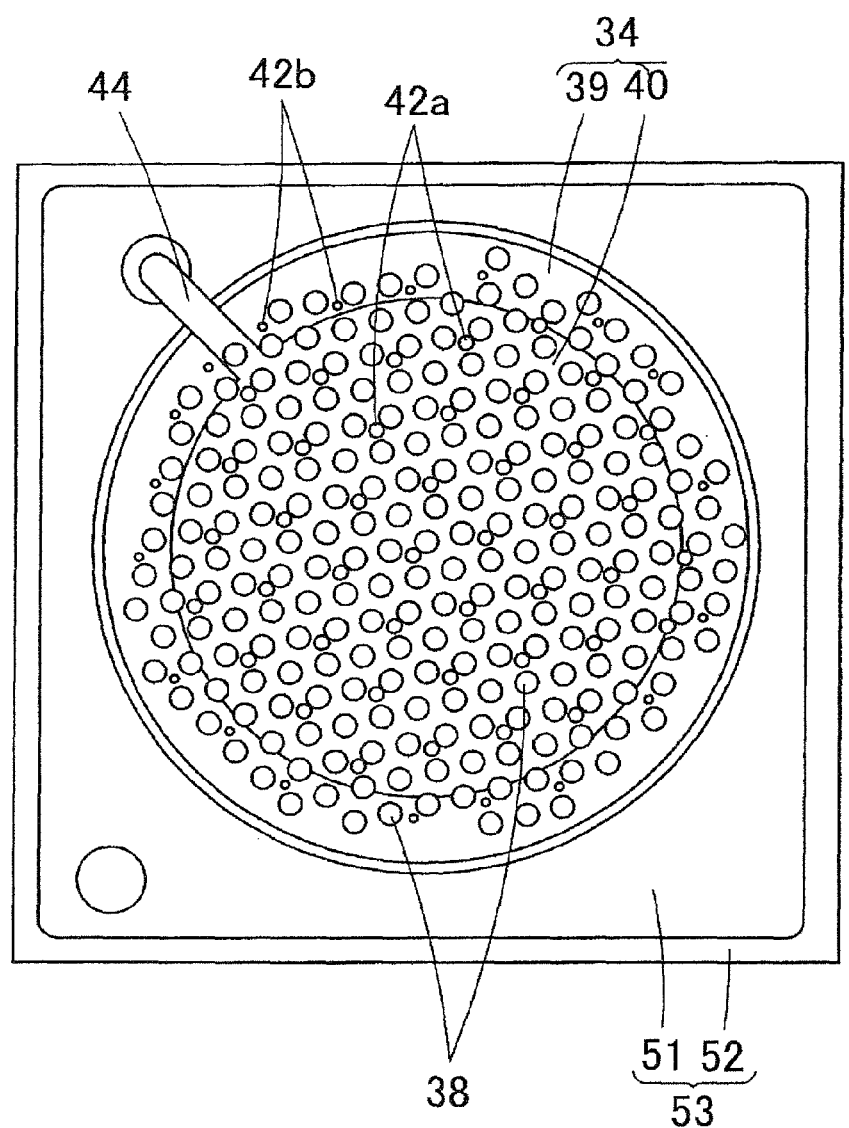
FIG. 5 is a bottom view of a back plate in the acoustic sensor of the first embodiment.
Figure 6:
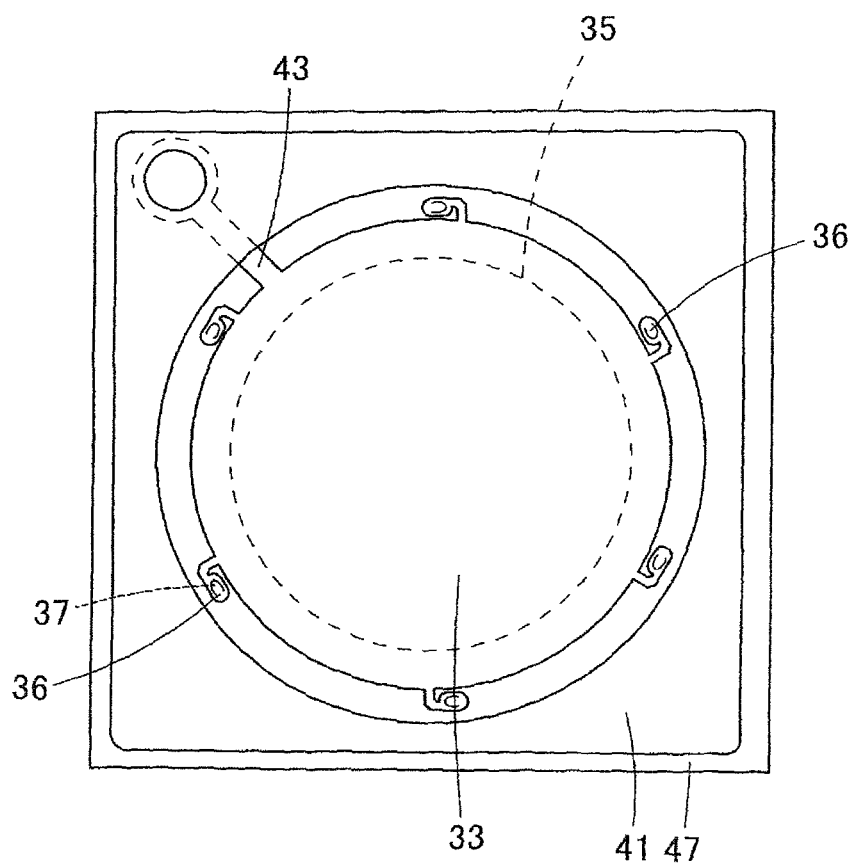
FIG. 6 is a plan view showing a state in which a back plate is removed from the acoustic sensor of a first embodiment.
Figure 7:
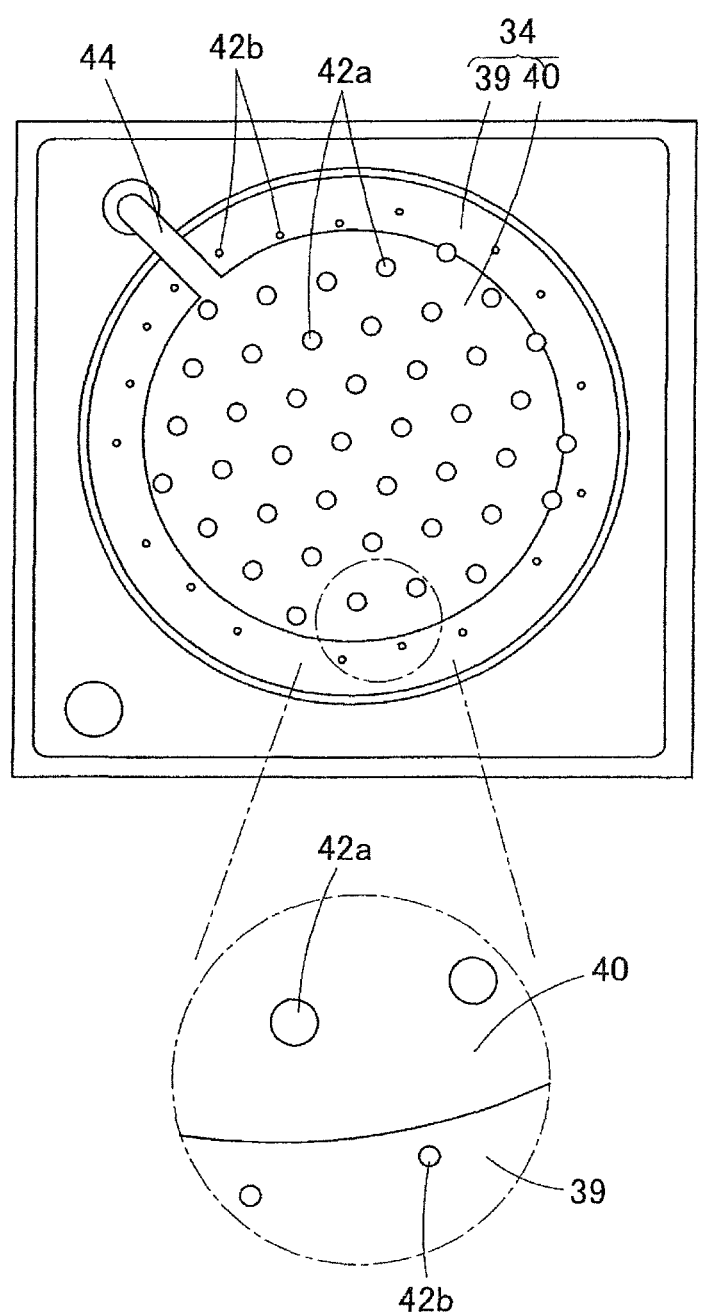
FIG. 7 is a bottom view of the back plate showing an arrangement of stoppers according to the first embodiment.

The structure of an acoustic sensor 31 according to a first embodiment of the present invention will be described with reference to FIGS. 3 to 7. FIG. 3 is a plan view showing the acoustic sensor 31 of the first embodiment. FIG. 4 is a cross-sectional view of the acoustic sensor 31. FIG. 5 is a bottom view of a back plate 14. FIG. 6 is a plan view of a state in which the back plate 14 is removed from the acoustic sensor 31. FIG. 7 is a bottom view of the back plate 14 in which acoustic holes 38 are not shown and only stoppers 42a, 42b are shown.

The acoustic sensor 31 is a capacitance type element formed using a MEMS technique, where a diaphragm 33 (vibration electrode film) is arranged on an upper surface of a silicon substrate 32 (semiconductor substrate) through an anchor 37, and a back plate 34 is fixed thereon through a microscopic air gap (void), as shown in FIG. 4.

A back chamber 35 (hollow portion) passing through from a front surface to a rear surface is opened in the silicon substrate 32 made of monocrystal silicon. The back chamber 35 may have an inner peripheral surface serving as a perpendicular surface, or may be inclined to a tapered shape.

A plurality of anchors 37 each for supporting a beam portion 36 of the diaphragm 33 are arranged on the upper surface of silicon substrate 32. Furthermore, as shown in FIG. 6, a base part 41 is formed on the upper surface of the silicon substrate 32 so as to surround the diaphragm 33. Furthermore, the region on the outer side than the base part 41 of the upper surface of the silicon substrate 32 is covered with an adhesive layer 47 thinner than the base part 41. The anchor 37 and the base part 41 are made from $SiO_2$. The adhesive layer 47 is made from $SiO_2$ or polysilicon.

As shown in FIG. 6, the diaphragm 33 is formed by a substantially circular plate shaped polysilicon thin film having conductivity. A plurality of beam portions 36 are extended from the outer peripheral edge of the diaphragm 33, and the beam portions 36 are arranged at equal interval. A band plate shaped extraction wiring 43 is extended toward the outer side from the diaphragm 33.

The diaphragm 33 is arranged on the upper surface of the silicon substrate 32 so as to cover the upper surface of the back chamber 35, and the lower surface of the beam portion 36 is fixed to the anchor 37. Therefore, the diaphragm 33 is supported in air, and a narrow ventilation hole 57 for passing through the acoustic vibration is formed between the lower surface at the outer peripheral part of the diaphragm 33 and the upper surface of the silicon substrate 32.

The back plate 34 has a fixed electrode film 40 made of polysilicon arranged on the lower surface of a plate portion 39 (fixed film) made of SiN. The back plate 34 is formed to a dome shape and includes a hollow portion thereunder, which hollow portion covers the diaphragm 33. The height of the hollow portion under the back plate 34 (height from the upper surface of the silicon substrate 32 to the lower surface of the fixed electrode film 40) is equal to the thickness of the base part 41 formed on the upper surface of the silicon substrate 32 from reasons of manufacturing. A microscopic air gap (void) is formed between the lower surface of the back plate 34 (i.e., lower surface of the fixed electrode film 40) and the upper surface of the diaphragm 33. The fixed electrode film 40 and the diaphragm 33 face each other and configure a capacitor.

A great number of acoustic holes (acoustic perforations) 38 for passing the acoustic vibration are perforated so as to pass through from the upper surface to the lower surface over substantially the entire back plate 34. As shown in FIG. 3 and FIG. 5, the acoustic holes 38 are regularly arrayed. In the illustrated example, the acoustic holes 38 are arrayed to a triangular shape along three directions forming an angle of 120° with respect to each other, but may be formed to a rectangular or a concentric shape.

As shown in FIG. 4 and FIG. 5, two types of microscopic stoppers 42a, 42b (projection) having a cylindrical shape are projecting out at the lower surface of the back plate 34. The stoppers 42a, 42b are integrally projecting out from the lower surface of the plate portion 39, pass through the fixed electrode film 40, and projected out to the lower surface of the back plate 34. The stoppers 42a, 42b are made of SiN same as the plate portion 39, and have insulating property. The stopper 42a and the stopper 42b have equal projection length, and the lower end faces of the stoppers 42a, 42b are aligned on the same plane, but the stopper 42a has a diameter greater than the stopper 42b.

As shown in FIG. 7 (acoustic holes 38 are not shown), the thin stoppers 42b are arranged at the outer peripheral area of the back plate 34, and the thick stoppers 42a are arranged at the interior area (region on the inner side than the outer peripheral area) of the back plate 34. In particular, the diaphragm 33 has a larger area than the fixed electrode film 40 in the illustrated example of the first embodiment, and the thin stoppers 42b are arranged in a region that is on the outer side than the fixed electrode film 40 and that faces the diaphragm 33. The thick stoppers 42a are arranged in a region where the fixed electrode film 40 is arranged.

The stoppers 42a and 42b are regularly arranged as a whole. The stoppers 42a, 42b may be arranged at the center of the region surrounded with the acoustic holes 38 or may be arranged at positions proximate to one of the acoustic holes 38.

A protective film 53 is continuously extended over the entire periphery from the outer peripheral edge of the canopy-shaped plate portion 39. The inner peripheral part of the protective film 53 is a base covering part 51 having a reverse groove shaped cross-section, and the outer peripheral part of the protective film 53 is a flat part 52. The plate portion 39 is fixed to the upper surface of the silicon substrate 32, the base covering part 51 covers the base part 41, and the flat part 52 covers the upper surface of the adhesive layer 47.

The extraction wiring 43 is fixed to the base part 41, and the extraction wiring 44 extended from the fixed electrode film 40 is also fixed to the upper surface of the base part 41. An opening is formed in the base covering part 51, where a movable side electrode pad 46 is formed on the upper surface of the extraction wiring 43 through the relevant opening and the movable side electrode pad 46 is conducted to the extraction wiring 43 (therefore, to the diaphragm 33). The fixed side electrode pad 45 arranged on the upper surface of the plate portion 39 is conducted to the extraction wiring 44 (therefore, to the fixed electrode film 40) through the through hole and the like.

However, if the acoustic vibration enters the air gap between the back plate 34 and the diaphragm 33 through the acoustic hole 38 in such an acoustic sensor 31, the diaphragm 33, which is a thin film, vibrates by the acoustic vibration. The electrostatic capacitance between the diaphragm 33 and the fixed electrode film 40 changes when the diaphragm 33 vibrates and a gap distance between the diaphragm 33 and the fixed electrode film 40 changes. As a result, in such an acoustic sensor 31, the acoustic vibration (change in sound pressure) sensed by the diaphragm 33 becomes the change in electrostatic capacitance between the diaphragm 33 and the fixed electrode film 40, and is outputted as an electrical signal.

Figure 8:
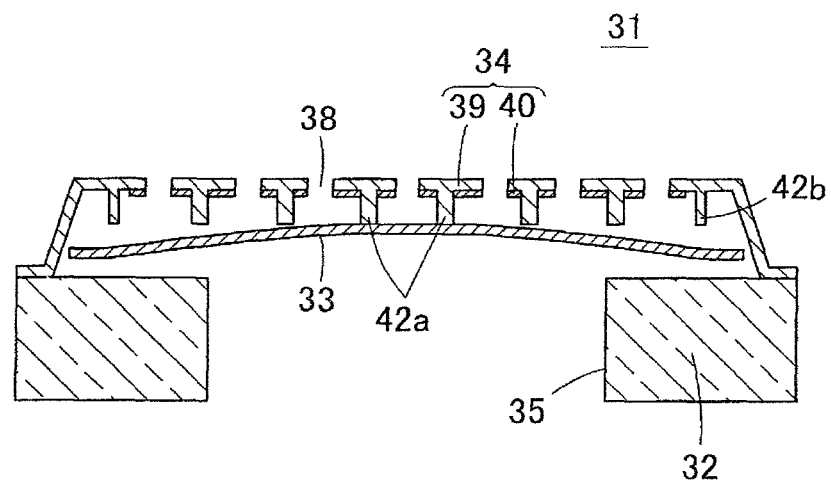
FIG. 8 is a schematic cross-sectional view for describing functional effects of the acoustic sensor of the first embodiment.

Such an acoustic sensor 31 has satisfactory impact resistance. Because the diaphragm 33 has the outer peripheral part held by the beam portions 36, the central part of the diaphragm 33 first hits the stopper, as shown in FIG. 8, when the acoustic sensor 31 drops. In such an acoustic sensor 31, however, the stoppers 42a in the interior area have a large diameter and, hence, the contacting area when the diaphragm 33 hits the stoppers 42a is large and the impact on the diaphragm 33 is alleviated. Therefore, the diaphragm 33 is less likely to break, and the drop resistance of the acoustic sensor 31 increases.

The diaphragm 33 may hit the stoppers other than when the acoustic sensor 31 is dropped such as when wind pressure is applied from the back chamber 35 to the diaphragm 33, or when acceleration is applied on the acoustic sensor 31. In such cases as well, the impact is alleviated and the diaphragm 33 is less likely to break because the central part of the diaphragm 33 hits the thick stoppers 42a. Therefore, according to the acoustic sensor 31, the impact resistance of the diaphragm 33 can be enhanced without being limited to the drop resistance.

Figure 9:
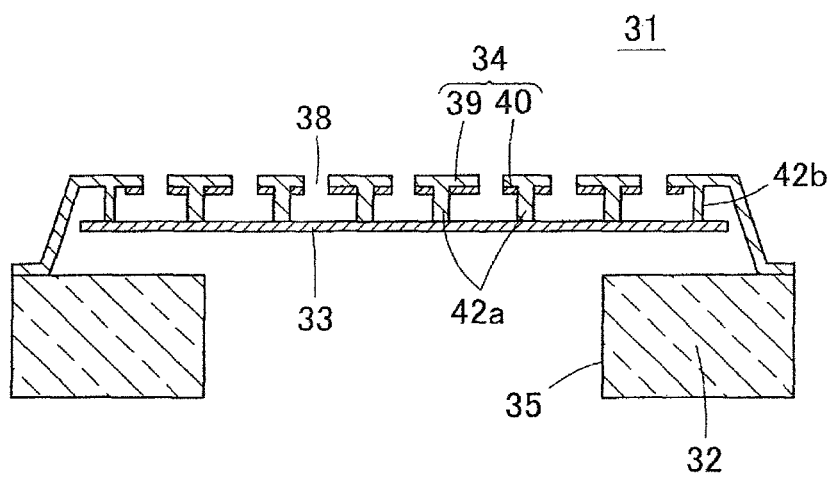
FIG. 9 is a schematic cross-sectional view for describing the functional effects of the acoustic sensor of the first embodiment.
Figure 10:
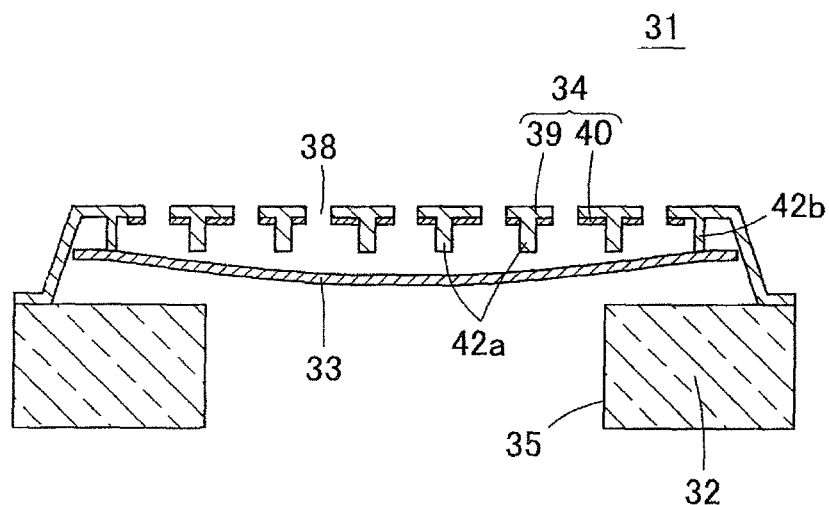
FIG. 10 is a schematic cross-sectional view for describing the functional effects of the acoustic sensor of the first embodiment.

In the acoustic sensor 31, the sticking resistance property also increases. Even if the entire diaphragm 33 sticks to the lower surface of the stoppers 42a, 42b as shown in FIG. 9, the elastic restoring force of returning to the original position is strong at the central part of the diaphragm 33 compared to its outer peripheral part, and hence, the central part of the diaphragm 33 tends to easily strip from the stoppers 42a and return to the original position as shown in FIG. 10 even if the diameter of the stopper 42a is large. The outer peripheral part of the diaphragm 33 (portion not fixed with the beam portion 36 of the outer peripheral part) is the free end, and thus, the outer peripheral part of the diaphragm 33 has weak elastic restoring force compared to the central part. However, in such an acoustic sensor 31, the contacting area between the outer peripheral part of the diaphragm 33 and the stopper 42b is small because the diameter of the stopper 42b is small, so that the outer peripheral part of the diaphragm 33 easily strips from the stopper 42b and returns to the original position even with a relatively small elastic restoring force, and hence, sticking is less likely to occur.

According to the acoustic sensor 31, the diameter of the stopper 42a arranged in the interior area of the back plate 34 is increased and the diameter of the stopper 42b arranged in the outer peripheral area is reduced to achieve the contradicting effect of enhancing impact resistance and preventing sticking of the acoustic sensor 31.

The dimension or the like of the stoppers 42a, 42b that can optimize the functional effects of the present invention will now be described. According to one or more embodiments of the present invention, the stopper 42a arranged at the central area has a diameter of greater than or equal to 1 μm to alleviate the impact in time of drop test or the like. If the diameter is smaller than 1 μm, the contacting area with the diaphragm 33 becomes too small and the alleviation of the impact property in the case where the diaphragm 33 hits becomes insufficient.

According to one or more embodiments of the present invention, the stopper 42b arranged at the outer peripheral area has a diameter of smaller than or equal to 5 μm (but smaller than the diameter of the stopper 42a) to prevent sticking of the diaphragm 33. If the diameter is greater than 5 μm, the contacting area with the diaphragm 33 becomes too large and the holding force at the stopper 42b becomes too large, and the sticking of the diaphragm 33 cannot be reliably prevented.

Assuming the width of the outer peripheral area arranged with the stopper 42b having a small diameter as shown in FIG. 4 is X and the width of the deforming region of the diaphragm 33 is W, the width X of the outer peripheral area is smaller than or equal to ¼ (i.e., $X \leq W/4$) of the width W of the deforming region of the diaphragm 33 according to one or more embodiments of the present invention. If the width W of the outer peripheral area is greater than ¼, the area where the stopper 42b of small diameter is arranged becomes wide, and hence, the vicinity of the central part of the diaphragm 33 may be in contact with the stopper 42b having a small diameter when impact is applied on the acoustic sensor 31, and the impact resistance may be affected.

If the area ratio (ratio of cross-sectional areas perpendicular to the length direction) of the stopper 42a of the interior area and the stopper 42b of the outer peripheral area is too close, the stoppers 42a, 42b may not sufficiently exhibit the effect in the respective area. Therefore, according to one or more embodiments of the present invention, the ratio of the cross-sectional area of the stopper 42b with respect to the cross-sectional area of the stopper 42a is smaller than or equal to 0.75, so that the resistance impact and the sticking resistance property are easily satisfied.

The diameter and the arrangement of the stoppers 42a, 42b are determined according to the strength of the diaphragm 33, the spring constant of the diaphragm 33, the distance (gap distance) between the diaphragm 33 and the back plate 34, the applied load, or the like. For instance, the diaphragm 33 is a substantially square shape in which the length of one side is 720 μm, where the strength of the diaphragm 33 is weak if the film thickness is smaller than or equal to 1 μm. Hence, according to one or more embodiments of the present invention, the diameter of the stopper 42a in the interior area is greater than or equal to 3 μm (e.g., diameter of 5 μm) in view of the impact resistance in the interior area. Because the restoring force of the diaphragm 33 is small in the outer peripheral area, according to one or more embodiments of the present invention, the diameter of the stopper 42b in the outer peripheral area is a diameter of about half of the cross-sectional area of the stopper 42 (e.g., if diameter of the stopper 42a is 5 μm, the diameter of the stopper 42b is about 3.5 μm) in view of the sticking resistance property of the diaphragm 33. In such a case, the width X of the outer peripheral area is about 50 μm.

Other embodiments will now be described. Second to sixth embodiments have structures substantially similar to the acoustic sensor 31 of the first embodiment. Thus, schematic views do not show detailed structure so that different aspects from the first embodiment can be clearly shown. The same reference numerals are denoted in the drawings for portions of the same structure as the first embodiment, and the description thereof will not be given.

Second Embodiment

Figure 11:
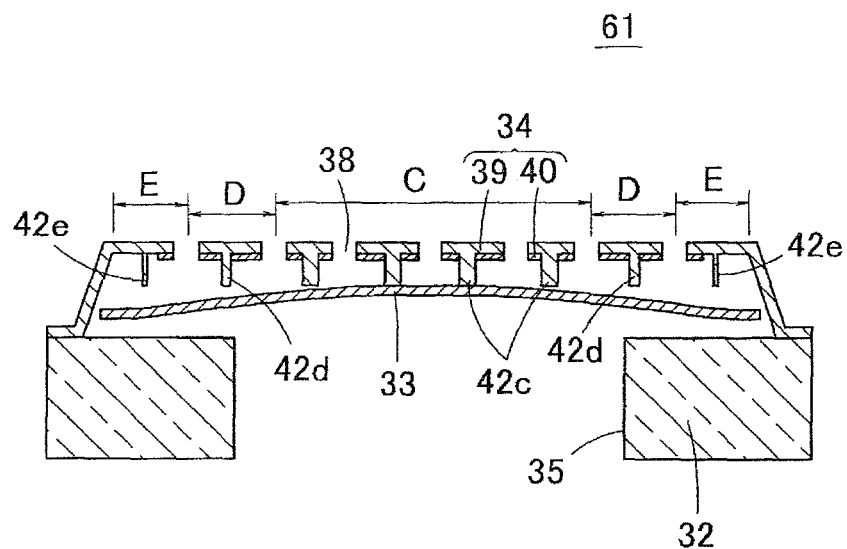
FIG. 11 is a schematic cross-sectional view showing an acoustic sensor according to a second embodiment of the present invention.

FIG. 11 is a schematic cross-sectional view showing an acoustic sensor 61 according to a second embodiment of the present invention. In the acoustic sensor 31 of the first embodiment, two types of stoppers 42a, 42b having different diameters are arranged on the lower surface of the back plate 34, but three or more types of stoppers having different diameters may be arranged.

In the acoustic sensor 61 shown in FIG. 11, a stopper 42e having the smallest diameter is arranged at the outermost peripheral area E, a stopper 42d having the second smallest diameter is arranged in an outer peripheral area D on the inner side of the outermost peripheral area E, and a stopper 42c having the largest diameter is arranged in an internal area C on the inner side of the outer peripheral area D at the lower surface of the back plate 34.

Third Embodiment

Figure 12:
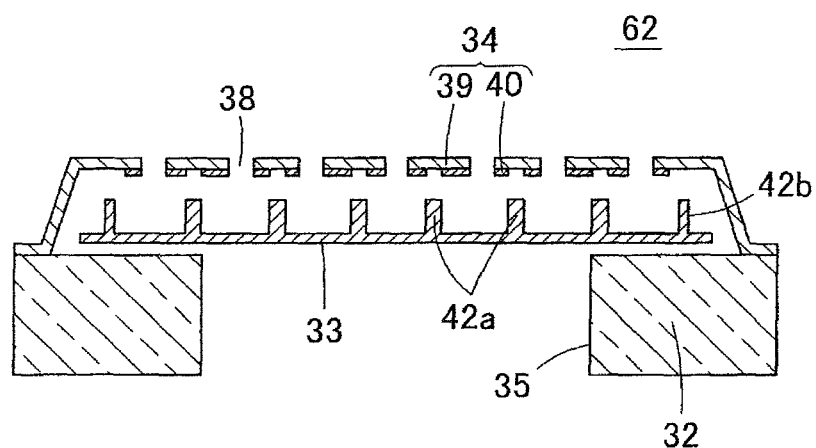
FIG. 12 is a schematic cross-sectional view showing an acoustic sensor according to a third embodiment of the present invention.

FIG. 12 is a schematic cross-sectional view showing an acoustic sensor 62 according to a third embodiment of the present invention. In the acoustic sensor 31 of the first embodiment, the stoppers 42a, 42b are arranged on the back plate 34, but the stoppers 42a, 42b are arranged on the upper surface of the diaphragm 33 in the acoustic sensor 62 of the third embodiment. In the acoustic sensor 62 as well, the stopper 42b having a small diameter is arranged at the outer peripheral area, and the stopper 42a having a large diameter is arranged in the internal area at the upper surface of the diaphragm 33. As a result, the impact resistance of the acoustic sensor 62 can be enhanced, and at the same time, the sticking of the diaphragm 33 can be prevented in the acoustic sensor 62 as well. In FIG. 12, a hole is formed in the fixed electrode film 40 at the area facing the distal end of the stopper 42a, 42b, so that the upper surface of the diaphragm 33 and the fixed electrode film 40 are prevented from being electrically short circuited. The hole may not be formed if a non-conductive material is applied on the surface of the fixed electrode film 40 or the diaphragm 33.

Fourth Embodiment

Figure 13:
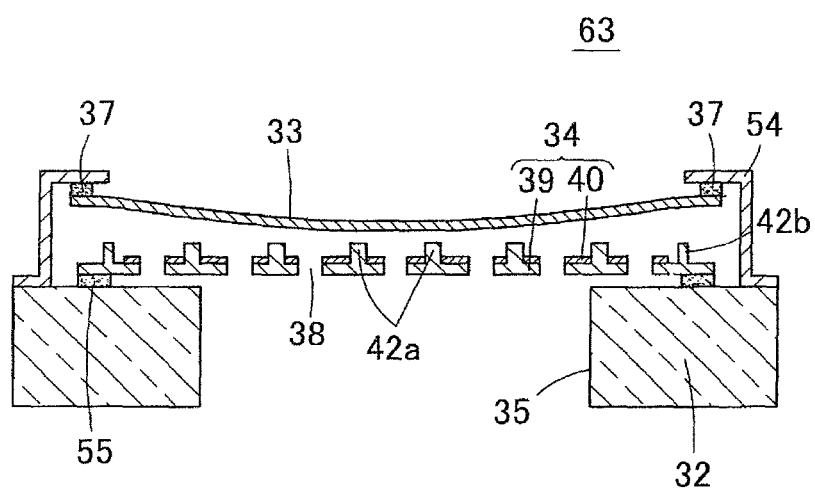
FIG. 13 is a schematic cross-sectional view showing an acoustic sensor according to a fourth embodiment of the present invention.

FIG. 13 is a schematic cross-sectional view showing an acoustic sensor 63 according to a fourth embodiment of the present invention. In the acoustic sensor 63, the back plate 34 is arranged on the upper surface of the silicon substrate 32, and the diaphragm 33 is arranged on the back plate 34 facing the back plate 34. The back plate 34 has the fixed electrode film 40 formed on the upper surface of the plate portion 39, and is fixed to the upper surface of the silicon substrate 32 by a spacer 55. The diaphragm 33 is supported by a supporting portion 54 fixed to the silicon substrate 32. The stoppers 42a, 42b are projected out from the upper surface of the back plate 34, where the stopper 42a having a large diameter is arrayed in the internal area of the back plate 34 and the stopper 42b having a small diameter is arrayed in the outer peripheral area.

Fifth Embodiment

Figure 14:
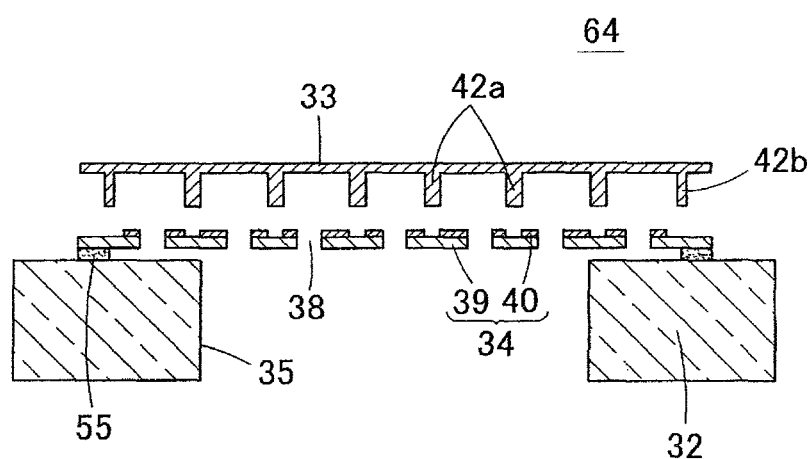
FIG. 14 is a schematic cross-sectional view showing an acoustic sensor according to a fifth embodiment of the present invention.

FIG. 14 is a schematic cross-sectional view showing an acoustic sensor 64 according to a fifth embodiment of the present invention. In this embodiment, the configurations of the diaphragm 33 and the back plate 34 are similar to the fourth embodiment. This embodiment differs from the fourth embodiment in that the stoppers 42a, 42b are arranged on the lower surface of the diaphragm 33.

Sixth Embodiment

Figure 15:
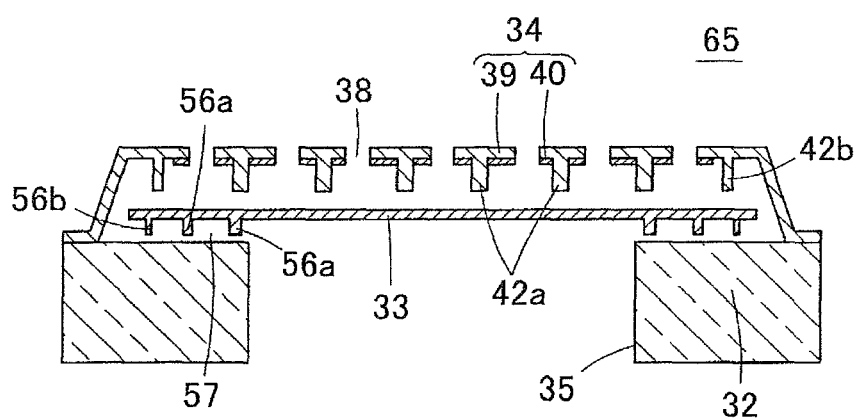
FIG. 15 is a cross-sectional view showing an acoustic sensor according to a sixth embodiment of the present invention.

FIG. 15 is a cross-sectional view showing an acoustic sensor 65 according to a sixth embodiment of the present invention. In such an acoustic sensor 65, projections 56a, 56b are arranged on the lower surface of the diaphragm 33 in the ventilation hole 57. The projection 56b arranged in the outer peripheral area has a smaller diameter than the projection 56a arranged in the inner peripheral area.

In this embodiment, the gap distance between the diaphragm 33 and the back plate 34 can be prevented from changing when the edge of the diaphragm 33 sticks to the upper surface of the silicon substrate 32 because the projections 56a, 56b are arranged on the lower surface of the diaphragm 33. Furthermore, the ventilation hole 57 can be prevented from narrowing and being blocked.

When the acoustic sensor 56 is dropped, the inner peripheral area of the diaphragm 33 tends to strongly hit the silicon substrate 32, but the impact of the diaphragm 33 is alleviated because the diameter of the projection 56a of the inner peripheral area is large. The projection 56b in the outer peripheral area that is likely to stick to the silicon substrate 32 as a free end has a small diameter, and the contacting area with the silicon substrate 32 is small, so that the sticking of the diaphragm 33 and the silicon substrate 32 can be prevented.

Seventh Embodiment

Figure 16:
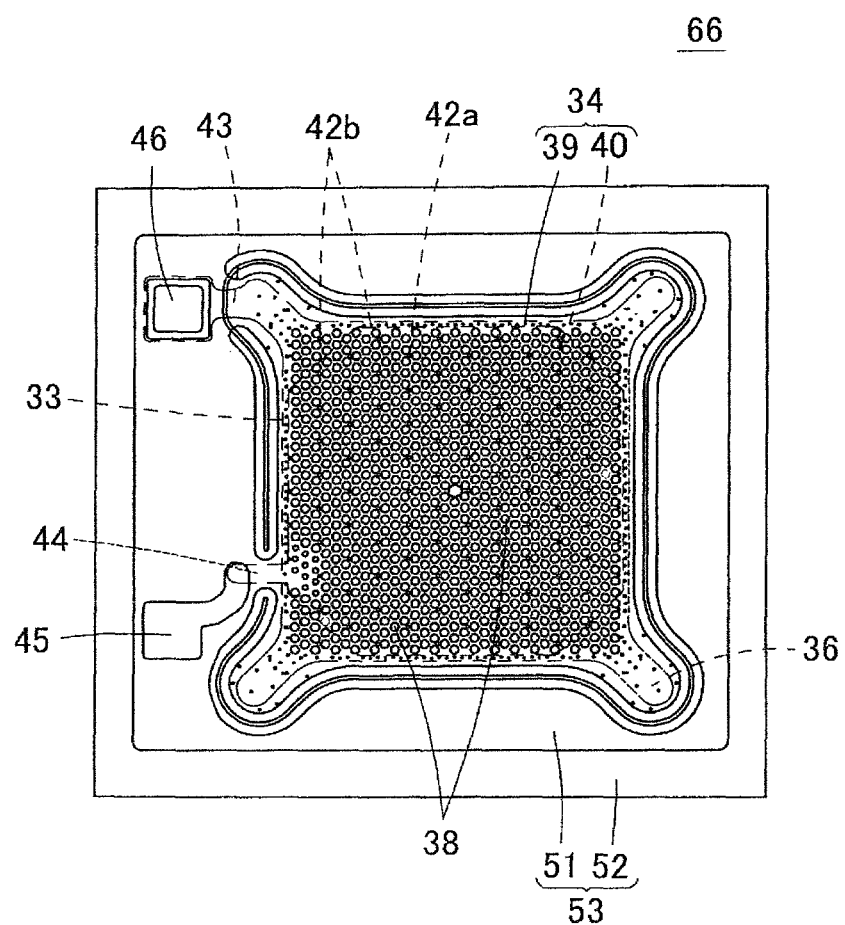
FIG. 16 is a plan view showing an acoustic sensor according to a seventh embodiment of the present invention.
Figure 17:
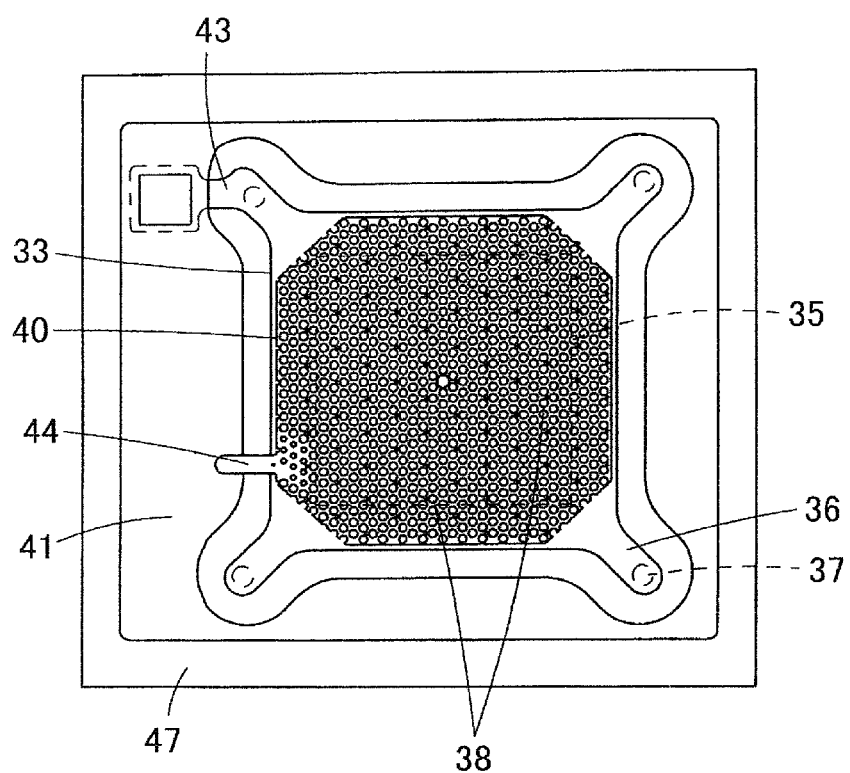
FIG. 17 is a plan view showing a state in which a plate portion is removed in the acoustic sensor of the seventh embodiment.
Figure 18:
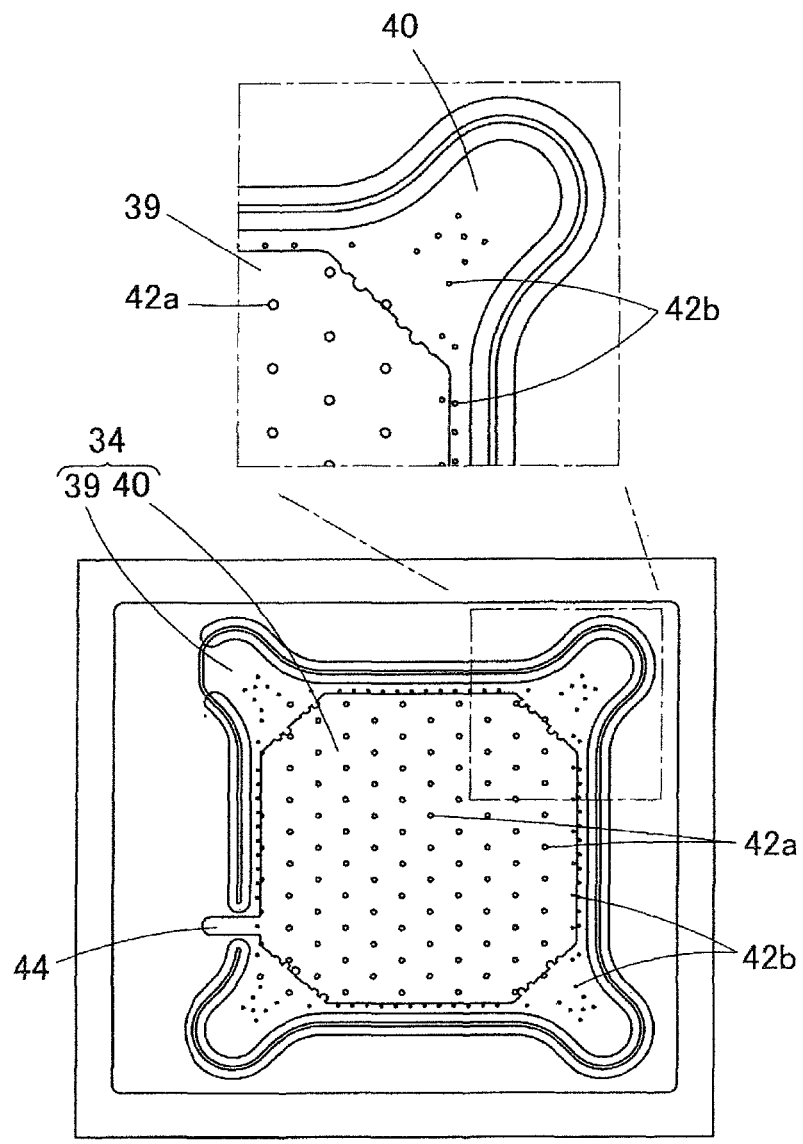
FIG. 18 is a bottom view of a back plate showing an arrangement of stoppers in the seventh embodiment.

FIG. 16 is a plan view showing an acoustic sensor 66 according to a seventh embodiment of the present invention. FIG. 17 is a plan view showing the fixed electrode film 40 and the diaphragm 33 with the plate portion 39 removed. FIG. 18 is a bottom view of the back plate 34 showing the arrangement of the stoppers 42a, 42b in the acoustic sensor 66, where one part is shown in an enlarged manner.

The acoustic sensor 66 has a structure substantially similar to the acoustic sensor 31 of the first embodiment, but the diaphragm 33 and the back plate 34 have a substantially rectangular shape. The beam portions 36 are extended in the diagonal direction from the four corners of the substantially rectangular diaphragm 33, and the lower surface of each beam portion 36 is supported by the anchor 37. The back plate 34 has the fixed electrode film 40 of octagon shape formed at the lower surface of the substantially rectangular plate portion 39.

In this acoustic sensor 66 as well, the stopper 42b having a small diameter is projected out in the outer peripheral area of the lower surface of the back plate 34, and the stopper 42a having a large diameter is projected out in the interior area thereof. Therefore, in the acoustic sensor 66 as well, the impact resistance of the diaphragm 33 can be enhanced so that the breakage of the diaphragm 33 can be prevented, and furthermore, the sticking of the diaphragm 33 is less likely to occur.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An acoustic sensor, comprising:
a back plate comprising:
a fixed film arranged on an upper side of a semiconductor substrate; and
a fixed electrode film arranged on the fixed film; and
a vibration electrode film arranged on the upper side of the semiconductor substrate to face the back plate through a void,
wherein the acoustic sensor converts an acoustic vibration into a change in electrostatic capacitance between the vibration electrode film and the fixed electrode film,
wherein a plurality of types of projections are arranged on a surface on the void side of at least one of the back plate and the vibration electrode film, and
wherein a cross-sectional area of the plurality of types of projections is differed according to a projection forming region in at least one of the back plate and the vibration electrode film.

2. The acoustic sensor according to claim 1,
wherein three or more types of projections having different cross-sectional areas are arranged; and
wherein the projections are arranged so that the cross-sectional area sequentially becomes smaller toward an outer peripheral side from a center of at least one of the back plate and the vibration electrode film.

3. The acoustic sensor according to claim 1,
wherein a projection having a relatively small cross-sectional area is arranged in an outer peripheral area of at least one of the back plate and the vibration electrode film, and
wherein a projection having a relatively large cross-sectional area is arranged in an internal area of at least one of the back plate and the vibration electrode film.

4. The acoustic sensor according to claim 3, wherein a width of the outer peripheral area where the projection having a relatively small cross-sectional area is arranged is smaller than or equal to ¼ of a width of the back plate or the vibration electrode film.

5. The acoustic sensor according to claim 1,
wherein the semiconductor substrate is formed with a hollow portion from an upper surface to a lower side,
wherein the vibration electrode film is arranged on the upper surface of the semiconductor substrate,
wherein the back plate is fixed on the upper surface of the semiconductor substrate so as to cover the vibration electrode film, and
wherein a plurality of acoustic holes are opened in the back plate.

6. The acoustic sensor according to claim 1,
wherein a plurality of projections are arranged in a region facing an upper surface of the semiconductor substrate of a lower surface of the vibration electrode film, and
wherein the cross-sectional area of a projection arranged at an outer peripheral part of the region is smaller than the cross-sectional area of a projection arranged at an inner peripheral part of the region.

7. The acoustic sensor according to claim 1, wherein the back plate is fixed on an upper surface of the semiconductor substrate, and the vibration electrode film is arranged on an upper side of the back plate.

* * * * *